United States Patent
Sannomiya et al.

(10) Patent No.: US 7,245,233 B2
(45) Date of Patent: Jul. 17, 2007

(54) LIGHT RECEIVING DEVICE AND ENCODING DEVICE

(75) Inventors: Hideaki Sannomiya, Atsugi (JP); Naosumi Waki, Atsugi (JP); Yuko Kimura, Atsugi (JP); Junichiro Tanaka, Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 11/390,736

(22) Filed: Mar. 28, 2006

(65) Prior Publication Data
US 2007/0008190 A1    Jan. 11, 2007

(30) Foreign Application Priority Data
Jun. 30, 2005    (JP) .............................. 2005-192401

(51) Int. Cl.
    *H03M 1/22*    (2006.01)
(52) U.S. Cl. ...................................................... 341/13

(58) Field of Classification Search ................... 341/13; 250/231.13, 231.16, 231.1
See application file for complete search history.

(56) References Cited

U.S. PATENT DOCUMENTS

| 4,691,101 | A * | 9/1987 | Leonard ................. 250/231.16 |
| 6,794,637 | B1 * | 9/2004 | Holzapfel et al. ...... 250/231.13 |
| 2001/0030282 | A1 * | 10/2001 | Steegmueller et al. . 250/231.13 |

FOREIGN PATENT DOCUMENTS

JP    06 0018290    1/1994

* cited by examiner

*Primary Examiner*—Brian Young
(74) *Attorney, Agent, or Firm*—Ladas & Parry LLP (57) ABSTRACT

A light receiving device is disclosed that is able to reduce jitter and to improve detection resolution. The light receiving device has plural light receiving elements each having a rectangular light receiving area. The light receiving areas are connected to each other at vertices on diagonals thereof, and sides of the light receiving areas of neighboring light receiving elements are adjacent to each other.

9 Claims, 6 Drawing Sheets

LIGHT RECEIVING DEVICE AND ENCODING DEVICE

BACKGROUND OF THE INVENTION

1. Field of the Invention

The present invention relates to a light receiving device and an encoding device, and particularly, to a light receiving device including plural light receiving elements and an encoding device thereof.

2. Description of the Related Art

In the related art, an encoding device is used to detect linear motion or rotational motion of an object, and input the detection results to a computer or other digital devices. For example, the encoding device generates pulses corresponding to the motion of the object to make the detection.

Usually, the encoding device includes a member moving in a direction in which several openings are arranged, light receiving elements that detect light passing through the openings, and a signal processing unit that generates the pulses from the output signals of the respective light receiving elements. For example, Japanese Laid Open Patent Application No. 6-18290 discloses such a device.

Figure 6:
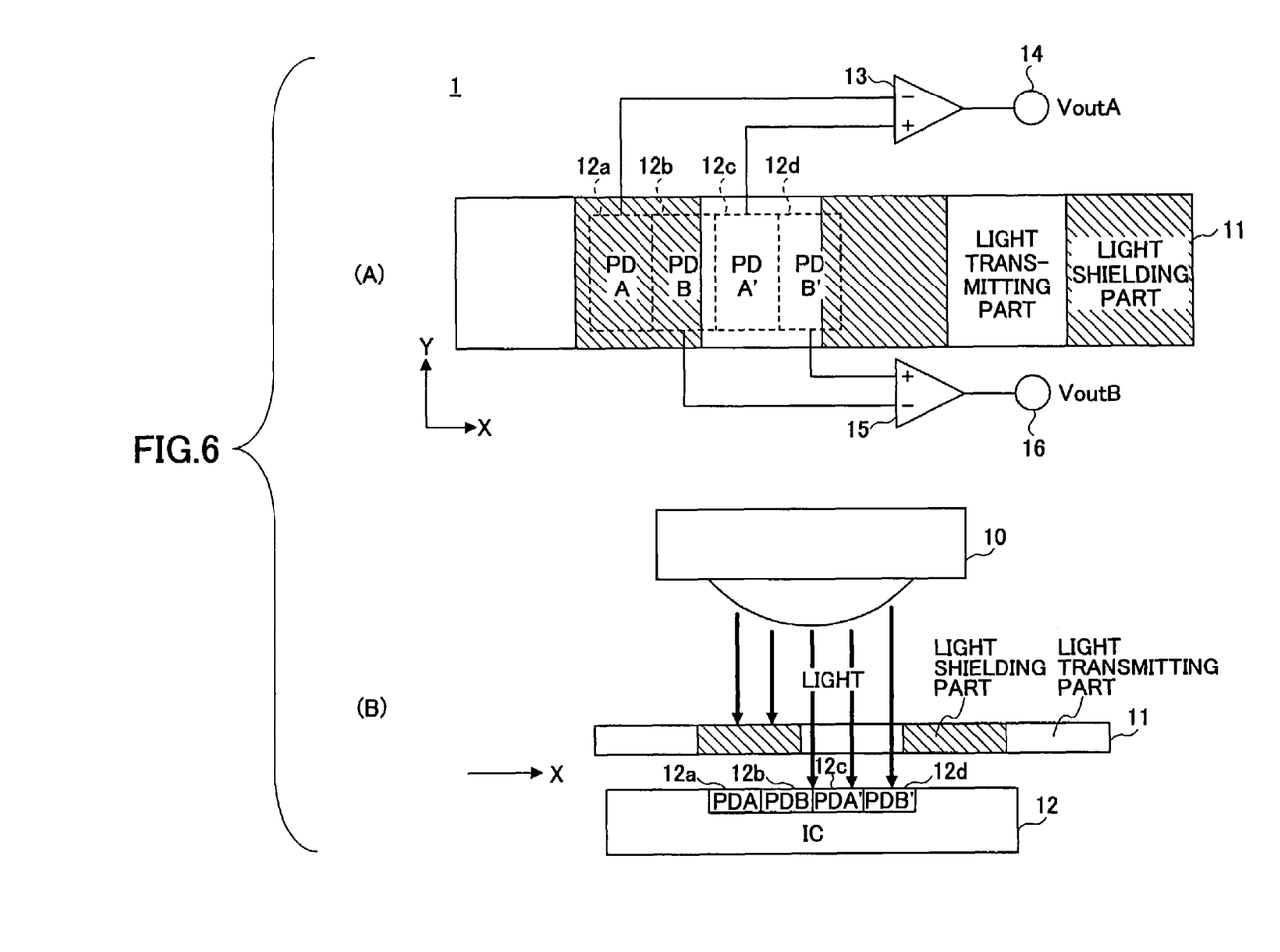
FIG. 6A and FIG. 6B are a plan view and a side view illustrating an encoding device in the related art.

FIG. 6A and FIG. 6B are a plan view and a side view illustrating an encoding device in the related art.

As shown in FIG. 6A and FIG. 6B, an encoding device 1 includes a light source 10, a slit member 11, and a light receiving unit 12.

The light source 10 and the light receiving unit 12 are fixed and are separated at a certain distance. The slit member 11 is arranged between the light source 10 and the light receiving unit 12, and is movable relative to the light source 10 and the light receiving unit 12 in X1 and X2 directions (the right side or the left side in the X direction in FIG. 6B). The slit member 11 is fixed to an object to be detected, and moves in the X direction when the object moves.

The light receiving unit 12 includes adjacent light receiving elements 12a, 12b, 12c, 12d arranged in the X direction. For example, the light receiving elements 12a, 12b, 12c, 12d are photo diodes. Each of the light receiving elements 12a, 12b, 12c, and 12d has a length dx1 in the X direction and a width dy1 in the Y direction, and the light receiving elements 12a, 12b, 12c, 12d have the same light receiving area.

The slit member 11 includes light transmitting parts 11a and light shielding parts 11b which are arranged alternately and repeatedly. Each of the light transmitting parts 11a and the light shielding parts 11b has a length dx2 in the X direction and a width dy2 in the Y direction, and dx2 and dy2 satisfy dx2=2×dx1, and dy2=dy1+α, that is, the width dy2 of the light transmitting parts 11a and the light shielding parts 11b is greater than the width dy1 of the light receiving elements 12a, 12b, 12c, 12d by α.

The output signals from the light receiving elements 12a, 12c are compared in a comparator 13, and the comparison result is output through a terminal 14 as a detection signal.

The output signals from the light receiving elements 12b, 12d are compared in a comparator 15, and the comparison result is output through a terminal 16 as a detection signal.

When the slit member 11 is moved relative to the light receiving unit 12 in the X1 direction (to the right side in the X direction in FIG. 6B), the output signal of the comparator 15 is later than the output signal of the comparator 13 by ¼ cycle. On the other hand, when the slit member 11 is moved relative to the light receiving unit 12 in the X2 direction (to the left side in the X direction in FIG. 6B), the output signal of the comparator 15 is earlier than the output signal of the comparator 13 by ¼ cycle.

However, in the encoding device 1 in the related art, because the edges of the light receiving elements 12a, 12b, 12c, 12d are formed to be parallel to the edges of the light transmitting parts 11a and the light shielding parts 11b, the detection signals of the light receiving elements 12a, 12b, 12c, 12d have monotonically increasing or decreasing waveforms. For this reason, jitter of the detection signals is large.

In addition, the detection resolution of the encoding device 1 is determined by the width of the light transmitting parts 11a and the light shielding parts 11b of the slit member 11, and changes with the width of the light transmitting parts 11a and the light shielding parts 11b of the slit member 11. In order to reduce the width of the light transmitting parts 11a and the light shielding parts 11b of the slit member 11, special techniques are required, and this increases the cost of the slit member 11. Further, if the width of the light transmitting parts 11a and the light shielding parts 11b of the slit member 11 are reduced, the light intensity supplied to the light receiving elements 12a, 12b, 12c, 12d become insufficient, and this causes degradation of the detection precision.

SUMMARY OF THE INVENTION

Accordingly, a general object of the present invention is to solve one or more problems in the related art.

A more specific object of the present invention is to provide a light receiving device able to reduce jitter and to improve detection resolution.

According to a first aspect of the present invention, there is provided a light receiving device, comprising: a plurality of light receiving elements each element having a rectangular light receiving area, said light receiving areas being connected to each other at vertices on diagonals thereof, sides of said light receiving areas of neighboring light receiving elements being adjacent to each other.

Preferably, the light receiving elements are arranged such that light receiving portions of the light receiving elements are in a lattice manner.

Preferably, the light receiving elements have substantially the same light receiving area.

Preferably, the light receiving elements comprise: a first light receiving element, a second light receiving element adjacent to the first light receiving element, a third light receiving element adjacent to the second light receiving element, a fourth light receiving element adjacent to the third light receiving element, a fifth light receiving element adjacent to the fourth light receiving element, a sixth light receiving element adjacent to the fifth light receiving element, a seventh light receiving element adjacent to the sixth light receiving element, and an eighth light receiving element adjacent to the seventh light receiving element, said light receiving device further comprises a first comparator that compares a detection signal of the first light receiving element to a detection signal of the fifth light receiving element; a second comparator that compares a detection signal of the second light receiving element to a detection signal of the sixth light receiving element; a third comparator that compares a detection signal of the third light receiving element to a detection signal of the seventh light receiving element; a fourth comparator that compares a detection signal of the fourth light receiving element to a detection signal of the eighth light receiving element; a first logic circuit that outputs an exclusive OR of an output signal of the first comparator and an output signal of the third comparator; and a second logic circuit that outputs an exclusive OR of an output signal of the second comparator and an output signal of the fourth comparator.

Preferably, the light receiving device is mounted on a semiconductor substrate chip.

According to a second aspect of the present invention, there is provided an encoding device, comprising: a slit member including a light transmitting portion configured to allow light from a light source to transmit through and a light shielding portion configured to shield the light from the light source; and a light receiving unit that includes a plurality of light receiving elements to detect light transmitting through the slit member, each of said light receiving elements having a rectangular light receiving area, said light receiving areas being connected to each other at vertices on diagonals thereof, sides of said light receiving areas of neighboring light receiving elements being adjacent to each other, wherein the light receiving unit detects movement of the slit member based on detection signals from the light receiving elements.

Preferably, a width of the light receiving unit in a movement direction of the slit member is half of widths of the light transmitting portion and the light shielding portion in the movement direction of the slit member.

According to the present invention, it is possible to reduce the jitter and to improve the detection resolution.

These and other objects, features, and advantages of the present invention will become more apparent from the following detailed description of the preferred embodiments given with reference to the accompanying drawings.

DESCRIPTION OF THE EMBODIMENTS

Below, embodiments of the present invention are explained with reference to the accompanying drawings.

System Configuration

Figure 1:
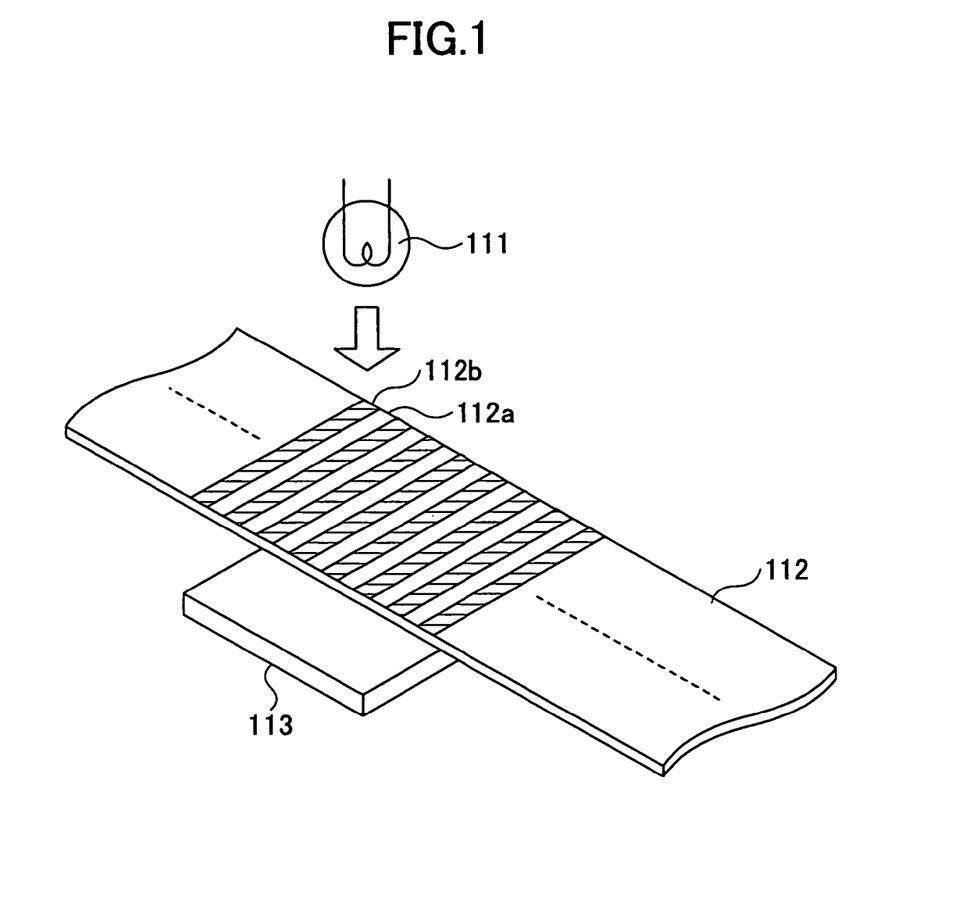
FIG. 1 is a view illustrating a configuration of an encoding device 100 according to an embodiment of the present invention.

FIG. 1 is a view illustrating a configuration of an encoding device 100 according to an embodiment of the present invention.

The encoding device 100 includes a light source 111, a slit member 112, and a light receiving unit 113.

The light source 111 is arranged at a position approximately opposite to the light receiving unit 113 with the slit member 112 in between. Light emitted from the light source 111 propagates to the slit member 112.

The slit member 112 includes light transmitting parts 112a and light shielding parts 112b. For example, the pattern of the slit member 112 can be formed by printing black ink on a transparent film to form the light shielding parts 112b. The slit member 112 is fixed on an object to be detected, and moves in an X direction by linear motion or rotational motion of the object.

Light Receiving Unit 113

Figure 2:
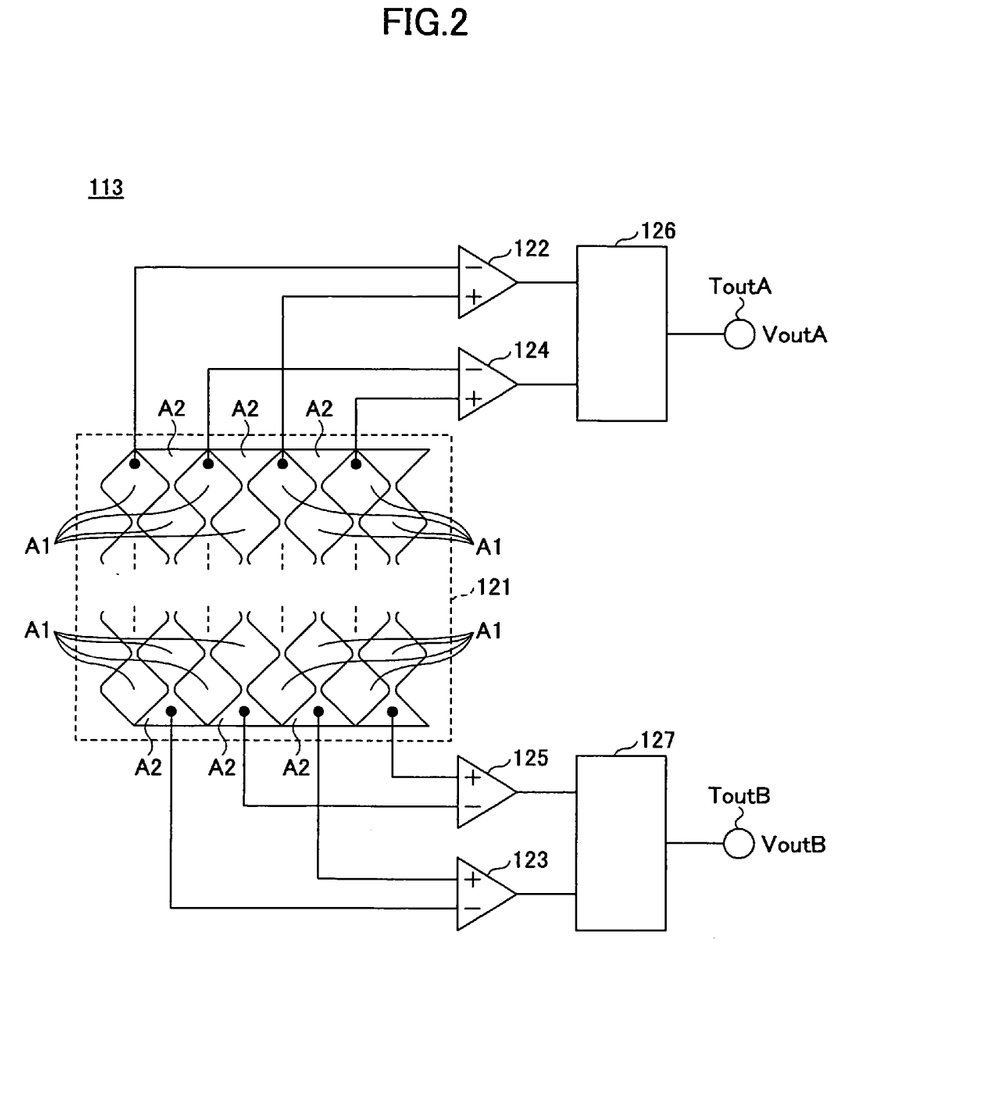
FIG. 2 is a block diagram exemplifying the light receiving unit 113.

FIG. 2 is a block diagram exemplifying the light receiving unit 113.

The light receiving unit 113 is a one-chip semiconductor device, and includes a light receiving area 121, comparators 122 through 125, and logic circuits 126 and 127.

Light Receiving Area 121

Figure 3:
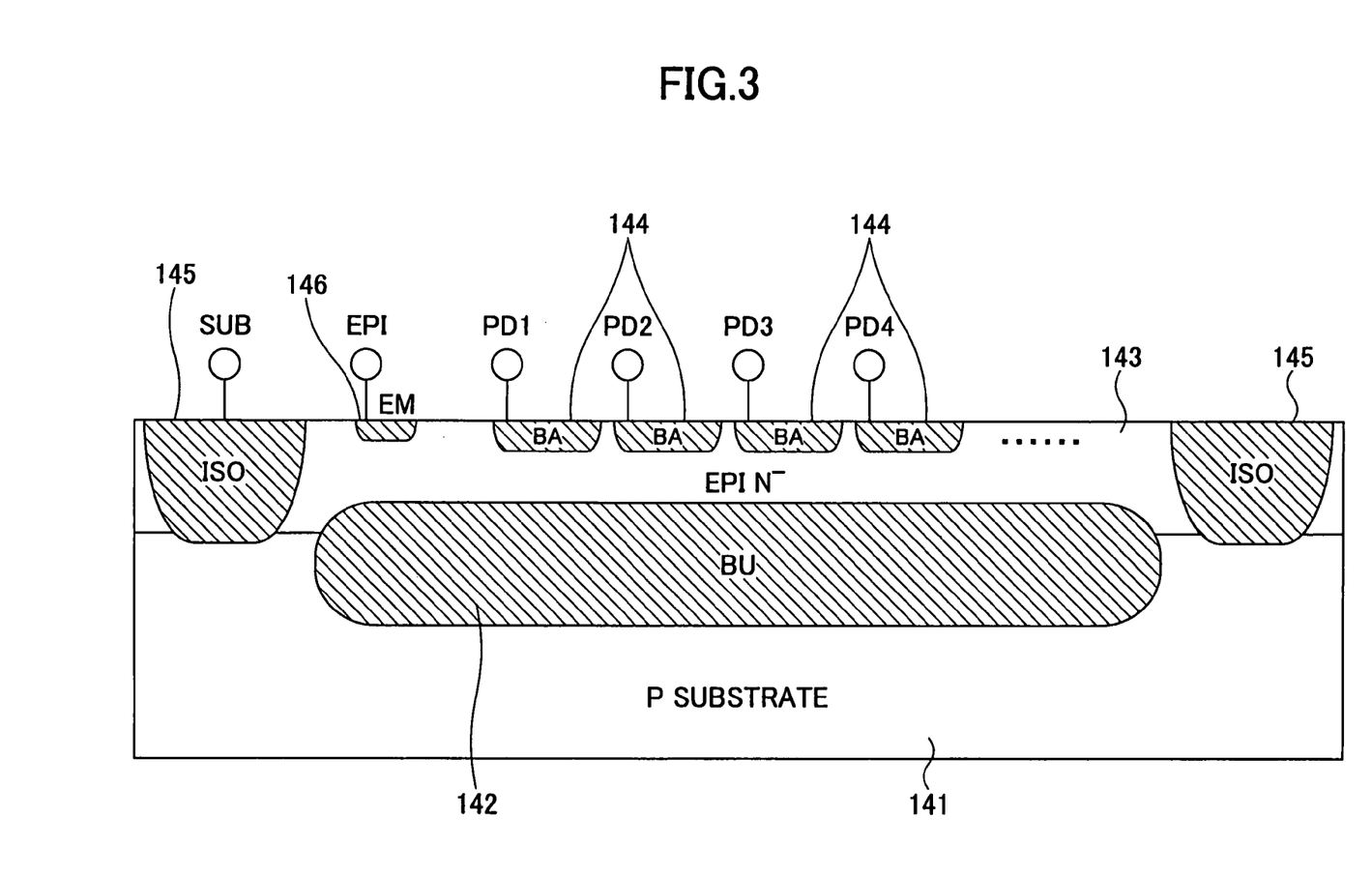
FIG. 3 is a cross-sectional view exemplifying the light receiving area 121.

FIG. 3 is a cross-sectional view exemplifying the light receiving area 121.

Figure 4:
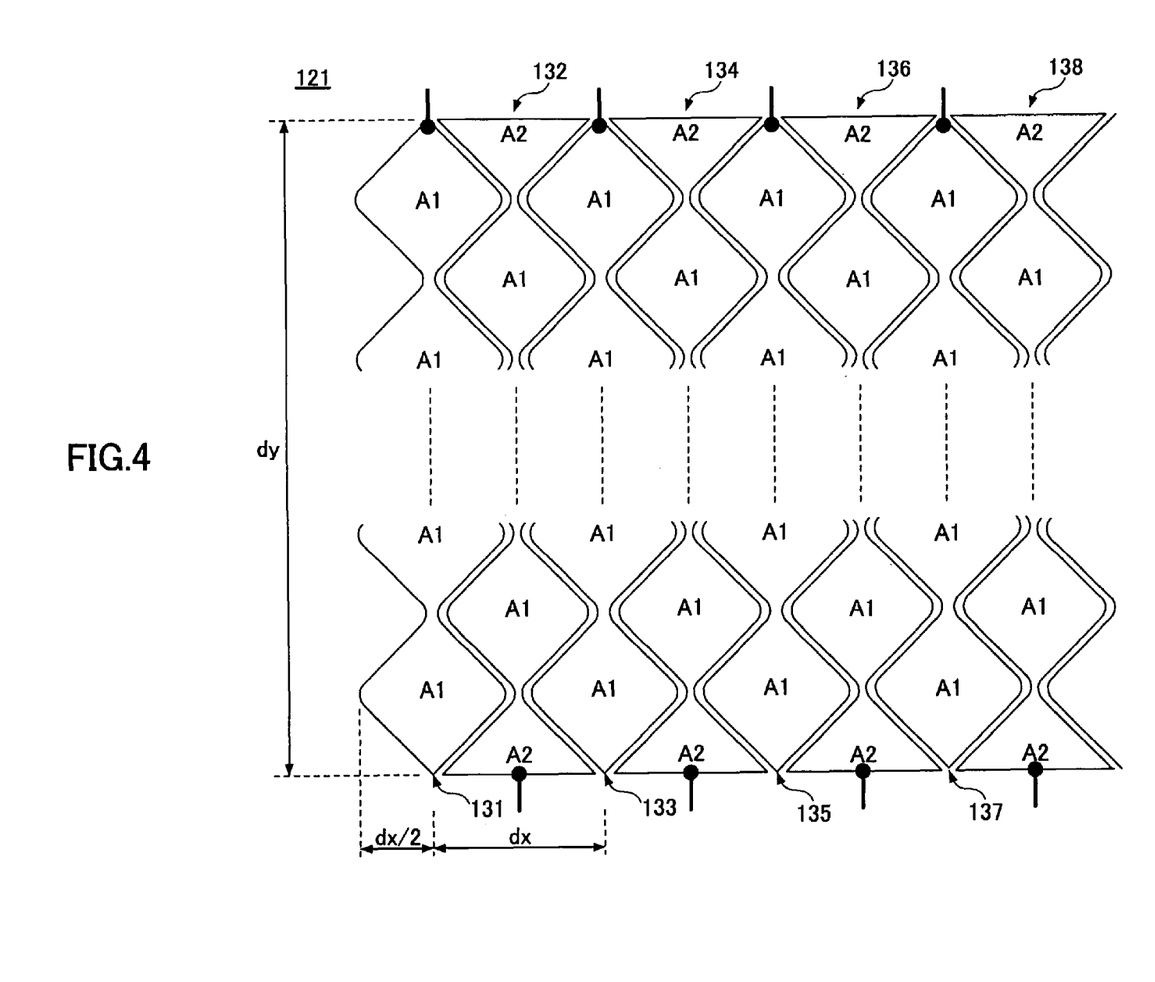
FIG. 4 is a plan view of the light receiving area 121.

FIG. 4 is a plan view of the light receiving area 121.

As shown in FIG. 3 and FIG. 4, the light receiving area 121 includes eight light receiving elements 131 through 138. The light receiving elements 131 through 138 output respective detection signals corresponding to the light transmitting through the light transmitting parts 112a of the slit member 112.

The light receiving elements 131 through 138 can be formed in the following way.

N-type epitaxial regions 143 are buried in a p-type semiconductor substrate 141 with a diffusing region 142 in between. P-type diffusing regions 144 are formed above the n-type epitaxial regions 143. Hence, pn junctions are formed between the n-type epitaxial regions 143 and the p-type diffusing regions 144.

The light receiving area 121 is isolated from the surrounding area by separation regions 145. The p-type diffusing regions 144 are connected to the outside to provide output signals of the light receiving elements 131 through 138.

In addition, the n-type epitaxial regions 143 are connected to the outside through a high concentration n-type diffusing region 146. In this structure, by increasing the thickness of the n-type epitaxial regions 143, it is possible to increase sensitivity of the light receiving elements 131 through 138.

Each of the light receiving elements 131, 133, 135, and 137 includes n light receiving zones A1, where the receiving zones A1 are rectangular and have substantially the same size. For example, the receiving zones A1 are square, the receiving zones A1 are connected at vertices on their diagonals, and are aligned in the Y direction as indicated by the arrow dy.

Each of the light receiving elements 132, 134, 136, and 138 includes (n−1) rectangular light receiving zones A1 and two triangular light receiving zones A2. The (n−1) rectangular receiving zones A1 have substantially the same size. For example, the receiving zones A1 are square, the receiving zones A1 are connected at vertices on their diagonals, and are aligned in the Y direction as indicated by the arrow dy. Each of the two triangular light receiving zones A2 corresponds to a portion of one receiving zone A1 cut by its diagonal. The right angular vertex of the triangular light receiving zones A2 is connected to two ends of one receiving zone A1.

The light receiving elements 131 through 138 are arranged such that sides of the light receiving zones A1 and A2 of neighboring light receiving elements are adjacent to each other. Hence, the light receiving elements 131 through 138 can be arranged in a small area. In addition, in the above arrangement, each of the light receiving elements 131 through 138 has nearly the same area for receiving incident light.

In the light receiving element 131, the p-type diffusing region 144 is connected to an inverting input terminal of a comparator 122.

In the light receiving element 132, the p-type diffusing region 144 is connected to an inverting input terminal of a comparator 123.

In the light receiving element 133, the p-type diffusing region 144 is connected to an inverting input terminal of a comparator 124.

In the light receiving element 134, the p-type diffusing region 144 is connected to an inverting input terminal of a comparator 125.

In the light receiving element 135, the p-type diffusing region 144 is connected to a non-inverting input terminal of the comparator 122.

In the light receiving element 136, the p-type diffusing region 144 is connected to a non-inverting input terminal of the comparator 123.

In the light receiving element 137, the p-type diffusing region 144 is connected to a non-inverting input terminal of the comparator 124.

In the light receiving element 138, the p-type diffusing region 144 is connected to a non-inverting input terminal of the comparator 125.

The detection signal from the light receiving element 131 is supplied to the inverting input terminal of the comparator 122.

The detection signal from the light receiving element 132 is supplied to the inverting input terminal of a comparator 123.

The detection signal from the light receiving element 133 is supplied to the inverting input terminal of a comparator 124.

The detection signal from the light receiving element 134 is supplied to the inverting input terminal of a comparator 125.

The detection signal from the light receiving element 135 is supplied to the non-inverting input terminal of the comparator 122.

The detection signal from the light receiving element 136 is supplied to the non-inverting input terminal of the comparator 123.

The detection signal from the light receiving element 137 is supplied to the non-inverting input terminal of the comparator 124.

The detection signal from the light receiving element 138 is supplied to the non-inverting input terminal of the comparator 125.

In addition, in the above structure, the width dx of the light receiving zones A1 and A2 of the light receiving elements 131 through 138 in the X direction is half of the width of the light transmitting portions 112a and the light shielding portions 112b of the slit member 112 in the X direction. That is, the width of the light transmitting portions 112a and the light shielding portions 112b the slit member 112 in the X direction is 2×dx.

In addition, the width of the light transmitting portions 112a and the light shielding portions 112b the slit member 112 in the Y direction is slightly greater than the width of the light receiving area 121 in the Y direction.

Specifically, if the width of the light receiving area 121 in the Y direction is dy, the width of the light transmitting portions 112a and the light shielding portions 112b of the slit member 112 in the Y direction equals dy+α (α is a small value). In contrast, when the width of the light receiving area 121 in the Y direction is dy, the width of the light receiving area 12a of the related art in the Y direction is 2×dy.

Comparators 122 through 125

When the level of the detection signal from the light receiving element 131 is higher than the level of the detection signal from the light receiving element 135, the comparator 122 outputs a low level signal; when the level of the detection signal from the light receiving element 131 is lower than the level of the detection signal from the light receiving element 135, the comparator 122 outputs a high level signal. The output signal from the comparator 122 is supplied to the logic circuit 126.

When the level of the detection signal from the light receiving element 132 is higher than the level of the detection signal from the light receiving element 136, the comparator 123 outputs a low level signal; when the level of the detection signal from the light receiving element 132 is lower than the level of the detection signal from the light receiving element 136, the comparator 123 outputs a high level signal. The output signal from the comparator 123 is supplied to the logic circuit 127.

When the level of the detection signal from the light receiving element 133 is higher than the level of the detection signal from the light receiving element 137, the comparator 124 outputs a low level signal; when the level of the detection signal from the light receiving element 133 is lower than the level of the detection signal from the light receiving element 137, the comparator 124 outputs a high level signal. The output signal from the comparator 124 is supplied to the logic circuit 126.

When the level of the detection signal from the light receiving element 134 is higher than the level of the detection signal from the light receiving element 138, the comparator 125 outputs a low level signal; when the level of the detection signal from the light receiving element 134 is lower than the level of the detection signal from the light receiving element 138, the comparator 125 outputs a high level signal. The output signal from the comparator 125 is supplied to the logic circuit 127.

Logic Circuits 126 and 127

For example, the logic circuit 126 is formed from an exclusive OR gate, and outputs the exclusive OR of the output signals from the comparator 122 and the comparator 124. The output signal from the logic circuit 126 is output through an output terminal ToutA.

For example, the logic circuit 127 is formed from an exclusive OR gate, and outputs the exclusive OR of the output signals from the comparator 123 and the comparator 125. The output signal from the logic circuit 127 is output through an output terminal ToutB.

Operations

Figure 5:
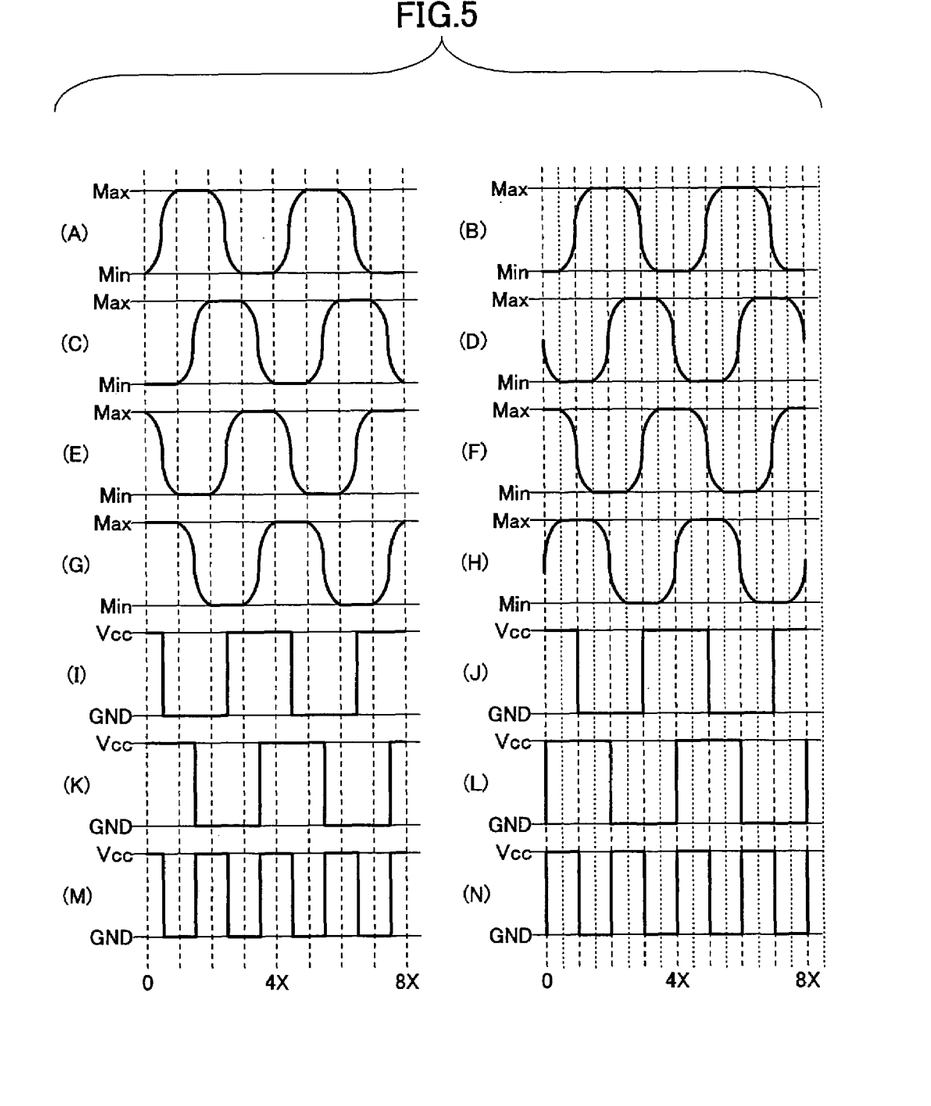
FIG. 5A through FIG. 5N are signal waveforms illustrating operations of the encoding device 100 according to the embodiment of the present invention.

FIG. 5A through FIG. 5N are signal waveforms illustrating operations of the encoding device 100 according to the embodiment of the present invention.

Specifically, FIG. 5A shows the detection signal from the light receiving element 131, FIG. 5B shows the detection signal from the light receiving element 132, FIG. 5C shows the detection signal from the light receiving element 133, FIG. 5D shows the detection signal from the light receiving element 134, FIG. 5E shows the detection signal from the light receiving element 135, FIG. 5F shows the detection signal from the light receiving element 136, FIG. 5G shows the detection signal from the light receiving element 137, FIG. 5H shows the detection signal from the light receiving element 138, FIG. 5I shows the output signal from the comparator 122, FIG. 5J shows the output signal from the comparator 123, FIG. 5K shows the output signal from the comparator 124, FIG. 5L shows the output signal from the comparator 125, FIG. 5M shows the output signal from the logic circuit 126, and FIG. 5N shows the output signal from the logic circuit 127.

As shown in FIG. 5A through 5H, with rectangular light receiving zones A1 and triangular light receiving zones A2, the rising edges and the falling edges of the detection signals from the light receiving elements 131 through 138 are quite sharp. Thus, it is possible to precisely detect the boundaries between the light transmitting parts 112a and the light shielding parts 112b of the slit member 112, and this reduces jitters.

From the detection signals of the light receiving elements 131 through 138 as shown in FIG. 5A through FIG. 5H, the output signals of the comparators 122 through 125 as shown in FIG. 5I through FIG. 5L are obtained. From the output signals of the comparators 122 through 125 as shown in FIG. 5I through FIG. 5L, the output signals of the logic circuits 126, 127 as shown in FIG. 5M and FIG. 5N are obtained.

The output signals of the logic circuits 126, 127 shown in FIG. 5M and FIG. 5N have a period corresponding to half of the signal period in the related art. Thus, it is possible to double the resolution.

According to the present embodiment, without changing the width of the light transmitting parts 112a and the light shielding parts 112b of the slit member 112 in the X direction, further, without increasing the area of the light receiving area 121, it is possible to double the resolution.

In addition, with rectangular light receiving zones A1 and triangular light receiving zones A2, the rising edges and the falling edges of the detection signals from the light receiving elements 131 through 138 are quite sharp. Thus, it is possible to precisely detect the boundaries between the light transmitting parts 112a and the light shielding parts 112b of the slit member 112, and this reduces jitter.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

For example, the slit member 112 may be formed by etching a metal plate to form slits serving as the light transmitting portions 112a.

In addition, the light receiving zone A2 may have other shapes instead of a triangular shape; for example, it can be made by shielding half of the rectangular region A1 with light shielding material.

This patent application is based on Japanese Priority Patent Application No. 2005-192401 filed on Jun. 30, 2005, the entire contents of which are hereby incorporated by reference.

What is claimed is:

1. A light receiving device, comprising:
   a plurality of non-rectangular light receiving elements elongated in a first direction,
   wherein each light receiving element comprises light receiving areas of same shape or of a plurality of shapes that are connected to each other in the first direction,
   wherein the area where any two light receiving areas are connected to each other has a width (in the direction perpendicular to the first direction) narrower than the widths of the adjacent areas of the two connected light receiving areas.

2. The light receiving device as claimed in claim 1, wherein the light receiving device is mounted on a semiconductor substrate chip.

3. The light receiving device of claim 1, wherein each light receiving area is in a shape resembling substantially a polygon including a square or a rectangle such that two light receiving areas are connected to each other by their corners.

4. The light receiving device as claimed in claim 3, wherein the light receiving elements are arranged such that light receiving portions of the light receiving elements are in a lattice manner.

5. The light receiving device as claimed in claim 3, wherein the light receiving elements have substantially the same light receiving area.

6. The light receiving device as claimed in claim 1, further comprising:
   the light receiving elements including a first light receiving element,
   a second light receiving element adjacent to the first light receiving element,
   a third light receiving element adjacent to the second light receiving element,
   a fourth light receiving element adjacent to the third light receiving element,
   a fifth light receiving element adjacent to the fourth light receiving element,
   a sixth light receiving element adjacent to the fifth light receiving element,
   a seventh light receiving element adjacent to the sixth light receiving element, and an eighth light receiving element adjacent to the seventh light receiving element;
   said light receiving device including a first comparator that compares a detection signal of the first light receiving element to a detection signal of the fifth light receiving element;
   a second comparator that compares a detection signal of the second light receiving element to a detection signal of the sixth light receiving element;
   a third comparator that compares a detection signal of the third light receiving element to a detection signal of the seventh light receiving element;
   a fourth comparator that compares a detection signal of the fourth light receiving element to a detection signal of the eighth light receiving element:
   a first logic circuit that outputs an exclusive OR of an output signal of the first comparator and an output signal of the third comparator; and
   a second logic circuit that outputs an exclusive OR of an output signal of the second comparator and an output signal of the fourth comparator.

7. An encoding device, comprising:
   a slit member including a light transmitting portion configured to allow light from a light source to transmit through and a light shielding portion configured to shield the light from the light source; and
   a light receiving unit comprising a plurality of non-rectangular light receiving elements elongated in a first direction to detect the light transmitting through the slit member,
   wherein each light receiving element comprises light receiving areas of same shape or of a plurality of shapes that are connected to each other in the first direction,
   wherein the area where any two light receiving areas are connected to each other has a width (in the direction perpendicular to the first direction) narrower than the widths of the adjacent areas of the two connected light receiving areas, wherein the light receiving elements are positioned side-by-side with respect to each other in the first direction while no two areas having the narrowest widths are positioned along the same line perpendicular to the first direction, wherein the light receiving unit detects movement of the slit member based on detection signals from the light receiving elements.

8. The light receiving device of claim 7, wherein each light receiving area is in a shape resembling substantially a polygon including a square or a rectangle such that two light receiving areas are connected to each other by their corners.

9. The encoding device as claimed in claim 8, wherein a width of the light receiving unit in a movement direction of the slit member (which is in the direction substantially perpendicular to the first direction) is one half of either the width of the light transmitting portion or the width of the light shielding portion of the slit member.

* * * * *